(12) United States Patent
Teruggi

(10) Patent No.: US 9,296,026 B2
(45) Date of Patent: Mar. 29, 2016

(54) MACHINE AND METHOD FOR CONTINUOUSLY WASHING CONTAINERS MADE OF PLASTIC MATERIAL, AND REMOVAL OF CONTAMINANTS AND LABELS FROM THEIR SURFACE

(71) Applicant: Piergiorgio Teruggi, Novara (IT)

(72) Inventor: Piergiorgio Teruggi, Novara (IT)

(73) Assignee: AMUT S.P.A., Novara (IT)

( * ) Notice: Subject to any disclaimer, the term of this patent is extended or adjusted under 35 U.S.C. 154(b) by 232 days.

(21) Appl. No.: 14/204,412

(22) Filed: Mar. 11, 2014

(65) Prior Publication Data

US 2014/0318576 A1   Oct. 30, 2014

Related U.S. Application Data

(63) Continuation-in-part of application No. 12/681,171, filed as application No. PCT/IB2008/002506 on Sep. 26, 2008, now abandoned.

(30) Foreign Application Priority Data

Oct. 18, 2007   (EP) .................................... 07425657

(51) Int. Cl.
| B29B 17/02 | (2006.01) |
| B08B 9/38 | (2006.01) |
| B08B 9/08 | (2006.01) |
| B08B 3/10 | (2006.01) |
| B08B 7/02 | (2006.01) |
| B29L 31/00 | (2006.01) |

(52) U.S. Cl.
CPC . *B08B 9/38* (2013.01); *B08B 3/104* (2013.01); *B08B 7/02* (2013.01); *B08B 9/083* (2013.01); *B29B 17/02* (2013.01); *B29B 2017/0289* (2013.01); *B29L 2031/7158* (2013.01); *B29L 2031/744* (2013.01); *Y02W 30/622* (2015.05)

(58) Field of Classification Search
CPC ......................................................... B08B 9/38
See application file for complete search history.

(56) References Cited

U.S. PATENT DOCUMENTS

| 3,162,204 | A | 12/1964 | Babunovic |
| 4,041,963 | A | 8/1977 | Babunovic |
| 4,209,344 | A | 6/1980 | Simon |
| 5,143,308 | A | 9/1992 | Hally |
| 5,566,890 | A | 10/1996 | Ricciardelli |
| 6,770,780 | B1 | 8/2004 | Klenk |
| 6,797,073 | B1 | 9/2004 | Teruggi |

FOREIGN PATENT DOCUMENTS

| CN | 2848390 | 12/2006 |
| CN | 2918021 | 7/2007 |
| DE | 19618363 A1 | 6/1997 |
| JP | 57159612 A | 6/1980 |
| JP | 11099523 | 4/1999 |
| JP | 2005 5001325 | 1/2005 |
| JP | 2005001325 A | * 3/2014 |

\* cited by examiner

*Primary Examiner* — Michael Barr
*Assistant Examiner* — Jason Riggleman
(74) *Attorney, Agent, or Firm* — Hess Patent Law Firm LLC; Robert J. Hess

(57) ABSTRACT

A machine and a method are described for washing and removal, in a continuous manner, of contaminants and labels from plastic containers made of recyclable material. During washing, the containers pass inside a washing chamber and are subject to a high level of friction caused by an agitator rotating at high speed. Tearing means are also provided to facilitate detachment of the contaminants from the surface of the containers.

24 Claims, 3 Drawing Sheets

MACHINE AND METHOD FOR CONTINUOUSLY WASHING CONTAINERS MADE OF PLASTIC MATERIAL, AND REMOVAL OF CONTAMINANTS AND LABELS FROM THEIR SURFACE

CROSS-REFERENCE TO COPENDING PATENT APPLICATIONS

This is a continuation-in-part of U.S. Ser. No. 12/681,171 of May 25, 2010, which is a national phase entry from PCT/IB2008/002506 filed Sep. 26, 2008, which in turn claims the benefit of priority from European patent application serial no. EP 07425657.9 filed Oct. 18, 2007

FIELD OF THE INVENTION

The present invention concerns a machine for washing containers made of recyclable plastic, for example bottles for water, drinks or the like made of PET or other recyclable plastic materials. In particular, the present invention concerns a machine for the continuous washing of whole plastic containers or bottles and the removal of contaminants and/or plastic and paper labels from their surface.

STATE OF THE ART

Plastic containers having one or more recyclable parts generally undergo one or more washing steps before treatment for recovery of the required recyclable plastic materials. In the case of bottles made of PET, the known art proposes at least one pre-washing step with a heated washing fluid, if necessary together with steam at a high temperature, to remove the waste materials consisting for example of any paper or plastic labels fixed to the bottles by means of adhesives or the like.

A known example relating to a machine for continuous washing and removal of contaminants and labels from the surface of PET bottles is described in the European patent no. EP-0237127 in the name of Stamicarbon.

This document discloses a machine in which the bottles are immersed in a liquid bath heated to temperatures above 70 degrees C. to cause melting of the glues and yielding of the PET, so as to facilitate the detachment of contaminants and plastic or paper labels, and separation of caps and any bottoms made of plastics other than PET.

Another example of a machine for pre-washing PET bottles and separating any contaminants and labels is described in the international patent application no. WO 99/55508 A1 in the name of the Applicant. The machine comprises a hollow rotating cylinder provided with a perforated lateral wall for continuous expulsion of the washing fluid, the contaminants and the labels separated from the bottles and, lastly, the single bottles. The machine also accepts bottles in the form of bales or groups and uses a washing liquid heated to a temperature of 90 degrees C. and, if necessary, steam at high temperature.

PET bottles coated wholly or partly in PVC or PET shrink-wrap plastic sheaths or wrappers with colored and/or printed surface have recently have been introduced onto the market. These new types of bottles, increasingly widespread, are a problem for the systems of known type, which operate with a heated or high temperature washing fluid. When heated, the shrink-wrap sheaths and wrappers tend to contract and therefore adhere more closely to the outer surface of the bottle.

If the sheaths or wrappers adhering to the bottles are not removed, the bottles themselves, although cleaned, could be discarded during the subsequent steps for automatic selection of the recyclable materials (e.g. PET) from the contaminating materials (e.g. PVC). The automatic selection is generally performed by optical systems, which could interpret the bottles still covered in the sheaths as containers made of non-recyclable materials or containers that have not been thoroughly cleaned.

In a washing machine, the labels become so wet that they adhere to wet bottles. The use of airflow cannot be relied upon to separate such adhered wet labels from wet bottles. Clearly a weak airflow cannot overcome the adhering forces. Even if the force of the airflow were increased to a level in which in theory the airflow force exceeds the magnitude of the adhering force, the wet bottles are affected as well, causing the wet bottles to move with the wet labels into a common discharge channel rather than become separated.

SUMMARY OF THE INVENTION

One aspect of the present invention is a machine and a method for washing plastic containers in general, and in particular bottles, and for removing any type of contaminant and/or label in a continuous manner.

A further aspect of the present invention resides in a machine and a method of the type referred to above which permit reduction in the energy consumption necessary for removal of the contaminants and labels.

A further aspect of the present invention resides in a machine of the type referred to above with more compact dimensions than those of the known art.

According to a preferred aspect of the present invention, a machine is provided for the continuous washing of plastic containers and the removal of contaminants and labels from their surface, comprising: at least one fixed washing chamber having at least one inlet and one outlet for the containers; at least one agitator rotating inside the chamber and having a plurality of agitation blades; means for maintaining constant a filling level of containers inside said chamber and for maintaining constant a staying time of the plastic containers inside said washing chamber; means for feeding a washing fluid into the chamber and means for expelling the washing fluid together with the contaminants and labels removed from the surface of the containers.

The machine advantageously comprises tearing means suitable for acting on the contaminants and labels adhering to the surface of the containers during their transit inside the chamber to facilitate detachment of the contaminants and labels from the surface of the containers.

The process is performed continuously, i.e. by continuously feeding the containers and the washing fluid. In the same way, the washing fluid is continuously expelled together with the contaminants and labels detached from the surface of the containers via at least one portion of perforated wall present in the washing chamber, and the clean containers without contaminants and labels are continuously extracted from the machine.

In the method according to the present invention it is particularly advantageous to maintain a high agitator speed, and therefore a high speed of the blades integral with it in rotation, to facilitate not only the action of the tearing means but also a high level of friction between the containers passing through the inside of the washing chamber.

In particular, the rotation speed of the agitator is maintained substantially constant and sufficiently high in order to guarantee that the tangential velocity of the end of the blades is higher than 2.5 m/s.

In this way, by exploiting the action of the tearing means and the high level of friction between the containers, effective removal of the contaminants and labels adhering to the surface of the containers is obtained, not only glued paper labels but also shrink-wrap plastic sheaths or wrappers, without excessively heating the washing fluid.

The washing fluid is preferably an aqueous solution at ambient temperature or in any case an aqueous solution that can be slightly heated to a temperature not exceeding approximately 45 degrees C. The washing fluid can include detergent products. The temperatures can also be reached by the fluid operating in normal working conditions without the need to provide heating units for the fluid.

According to a possible embodiment of the present invention, the tearing means include a plurality of sharpened or pointed elements protruding towards the inside of the washing chamber and distributed in one or more portions of the chamber walls. Further protruding sharpened or pointed elements can also be arranged on one or more blades of the agitator.

In practice, the washing provides an elimination of the typical contaminants that are normally attached to the surface of the bottles, such as paper or plastic labels, the surface dirt and remains of the content of the bottles. In addition to the above-mentioned contaminants, the machine is also able to separate any extraneous particles present among the material to be treated, for example stones, glass, plastic and metal fragments.

With respect to the existing systems proposed for this purpose, the machine according to the invention is characterized by its capability to obtain the washing result using cold water, high friction and short material washing times, while the alternative methods use hot water and long washing times with a low level of friction. By reducing the time necessary for obtaining the required level of cleaning and separation of the contaminants and labels, it is also possible to produce the washing machine with more compact dimensions than the known machines.

In short, the most evident advantages of the present invention are:

energy saving, as cold water is used instead of water heated to 90 degrees C.;

possibility of detachment of the shrink-wrap labels, which with the known systems operating at high temperature tend to anchor even more firmly to the bottles and containers;

reduction of overall dimensions, since with the high level of friction, the container washing time is 4-5 times shorter and, consequently, the machine can be produced with more compact dimensions.

BRIEF DESCRIPTION OF THE DRAWINGS

Further advantages and characteristics of the present invention will become more evident from the following description, provided for illustrative and non-limiting purposes, with particular reference to the accompanying schematic drawings in which.

MODES FOR CARRYING OUT THE INVENTION

Figure 1:
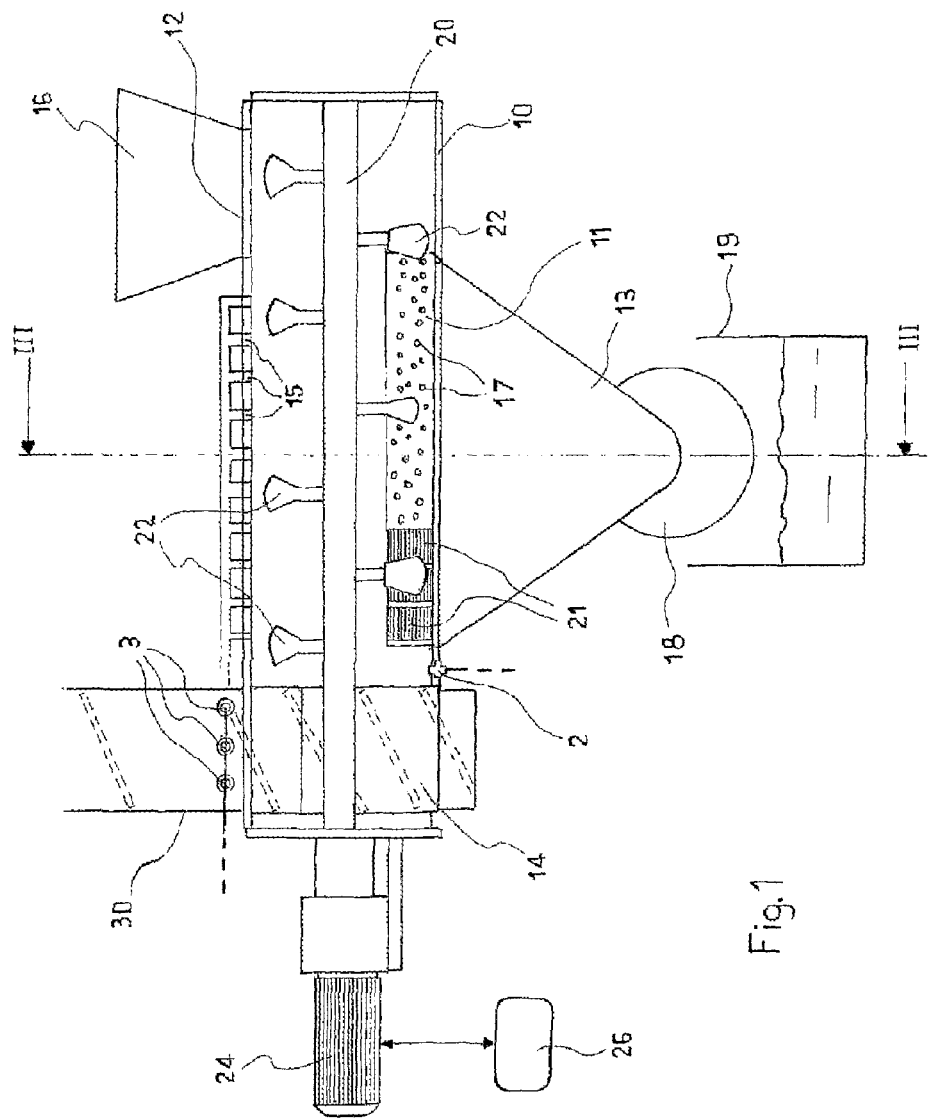
FIG. 1 is a longitudinal section view of the washing machine according to a possible embodiment of the present invention.

The washing machine according to the present invention comprises essentially a fixed washing chamber 10 with cylindrical shape, and an agitator 20 rotated inside the washing chamber 10 around an axis coinciding with that of the cylindrical chamber 10.

The embodiment shown here is intended in particular for the treatment of PET bottles, but it is evident that the same principles of the present invention can be adopted for other types of containers, as for other recyclable plastic materials.

A plurality of agitation blades 22 are arranged spread apart along the shaft of the agitator, positioned so as to facilitate transit of the containers into the washing chamber 10 from an inlet 12 to an outlet 14 so as to develop a friction action as they rotate in unison with rotation of the shaft. The containers are fed continuously via a hopper 16 and continuously extracted from the chamber 10 by means of an auger 30.

The containers are preferably fed to the washing chamber 10 at a constant mass flow rate and preferably in singularized condition, although small groups of bottles are tolerated (for example up to a maximum of approximately ten bottles).

The aqueous solution necessary for the washing process is introduced into the washing chamber 10 by means of the nozzles 15 distributed along the walls of the washing chamber 10, preferably in correspondence of the upper portion of the chamber.

The aqueous solution is introduced into the washing chamber 10 at ambient temperature, or in any case at a temperature not exceeding 45 degrees C. To improve the washing action, chemical detergents can be added to the process water, if necessary by means of appropriate metering pumps (not shown).

A fraction of the washing fluid can also be introduced via one or more nozzles 2 supplied at pressures higher than 80 bars, for example at a pressure of around 100 bars, to provide a vigorous hydraulic action for removal of the contaminants and labels, in addition to the mechanical action exerted by the blades 22. The high pressure nozzles 2 are preferably distributed on the walls of the chamber 10 immediately upstream of the outlet 14 of the containers, or in any case in the vicinity of the same, i.e. at a potential container accumulation point before they are extracted by means of the auger 30.

The blades 22 of the agitator 20, which rotate the bodies of the plastic containers, develop the friction action between the containers. Rubbing of the containers against one another and against the washing chamber 10 produces the vigorous action necessary for quick washing.

The agitator is operated by an electric motor 24 driven by a control unit 26. The agitator is rotated at high speed and, in particular, at a speed such that the tangential velocity measured at the end of the blades is higher than 2.5 m/s.

To increase the friction and facilitate detachment of the labels, above all of the shrink-wrap type, in the inner part of the washing chamber 10, sharpened or pointed elements 41 are applied, the protrusion of which can be regulated to optimize the operation. Such regulation includes adjustment, which enables reuse of the sharpened or pointed elements 41 or tips when they are shortened after sharpening operations. There is no "optimal" gap to be set in the present invention for the pointed elements or tips since any gap will suffice as long as the sharpened or pointed elements or tips are sharpened sufficiently to tear the labels.

Figure 2:
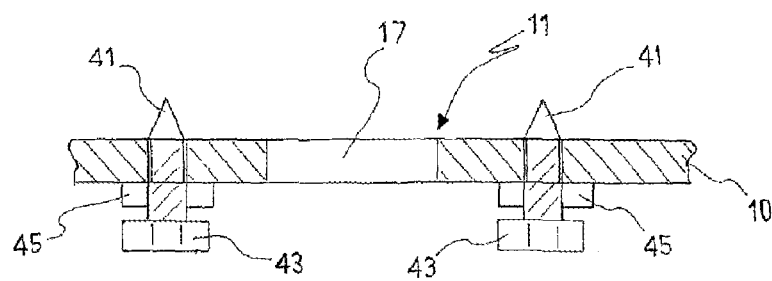
FIG. 2 is an enlarged view illustrating a detail of the washing machine shown in FIG. 1.

FIG. 2 shows by way of example an embodiment in which the pointed elements 41 constitute the ends of screws 43 engaged in corresponding threaded holes obtained in the wall of the washing chamber 10. A nut 45 permits adjustment of the protrusion of the pointed elements 41 towards the internal space of the washing chamber 10. The pointed elements 41 can be arranged along certain portions of the walls of the cylindrical chamber, or on one or more blades 22 of the agitator 20.

The view of FIG. 2 shows a detail of a perforated portion 11 (FIGS. 1 and 3) in the lower part of the washing chamber 10. The perforated portion 11 includes drainage holes 17 with circular section having a suitable diameter (for example, approximately 50 mm) for the drainage of solid contaminants such as stones, glass etc.

In addition to the portion 11 provided with circular holes, a perforated portion 21 (FIG. 1) can also be provided having rectangular apertures delimited by a series of small cylindrical bars. These holes, or apertures, have dimensions (for example, a rectangular hole with sides of approximately 19 mm by 120 mm) such as to facilitate the passage of any plastic or paper labels already detached from the containers but with dimensions such that they cannot easily pass through the circular holes 17. The cylindrical form of the bars that delimit these apertures also facilitates expulsion of the labels and contaminants, which assume a substantially flat shape once detached from the containers.

Via these circular and/or rectangular holes, the solid contaminants, the labels and the dirty aqueous solution are discharged and conveyed by a hopper 13 to a filter 18. The washing fluid separated from its solid particles is collected in a tank 19.

A fraction of the washing fluid present in the tank 19 can be withdrawn and mixed if necessary with a fraction of fresh fluid and re-introduced into the same washing chamber 10 via the nozzles 15 (FIG. 1).

Figure 3:
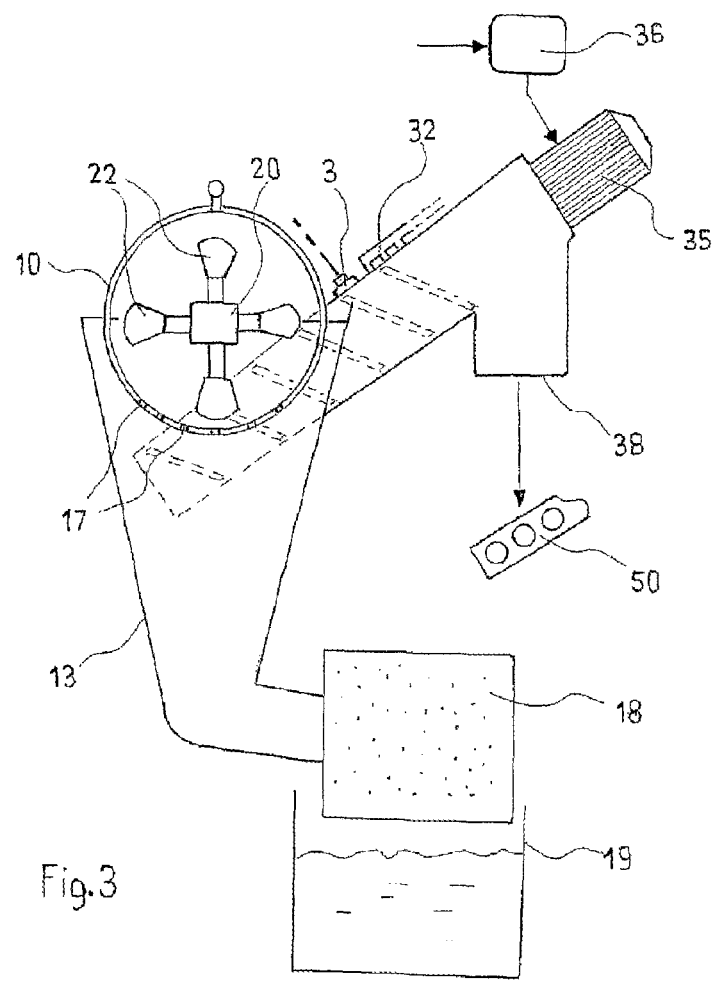
FIG. 3 is a cross section view along the plane III-III of the washing machine shown in FIG. 1.

The view of FIG. 3 highlights the system for extraction of the containers from the washing machine. In the continuous process carried out in the washing machine according to the present invention, due to the angle of the blades 22 of the agitator 20 (that is, the orientation of the blades 22), the containers move from the inlet to reach the outlet 14 where the auger 30, driven by an electric motor 35, also provides for extraction of said containers. The blades 22 are distributed along four radial rows as shown, but the number of blades 22 is preferably greater than that shown schematically in FIG. 1.

As far as the number of blades 22 is concerned, the washing machine according to one preferred embodiment of the present invention may have as many as 66 blades distributed in a cylindrical washing chamber 10, which may be 5 m long. Different capacities of throughput are obtained by changing the diameter of the chamber and the length of the blades.

The blades 22 could be also distributed in three or more rows (although the blades 22 are distributed in four rows in the preferred embodiment of the washing machine of the present invention) and can have from 64 to 72 blades. A larger number of blades 22 should be avoided for that size of cylindrical washing chamber 10 in order to leave sufficient space for the containers and obtain the correct filling level of containers. A smaller number of blades 22 would result in a less efficient action.

Figure 4:
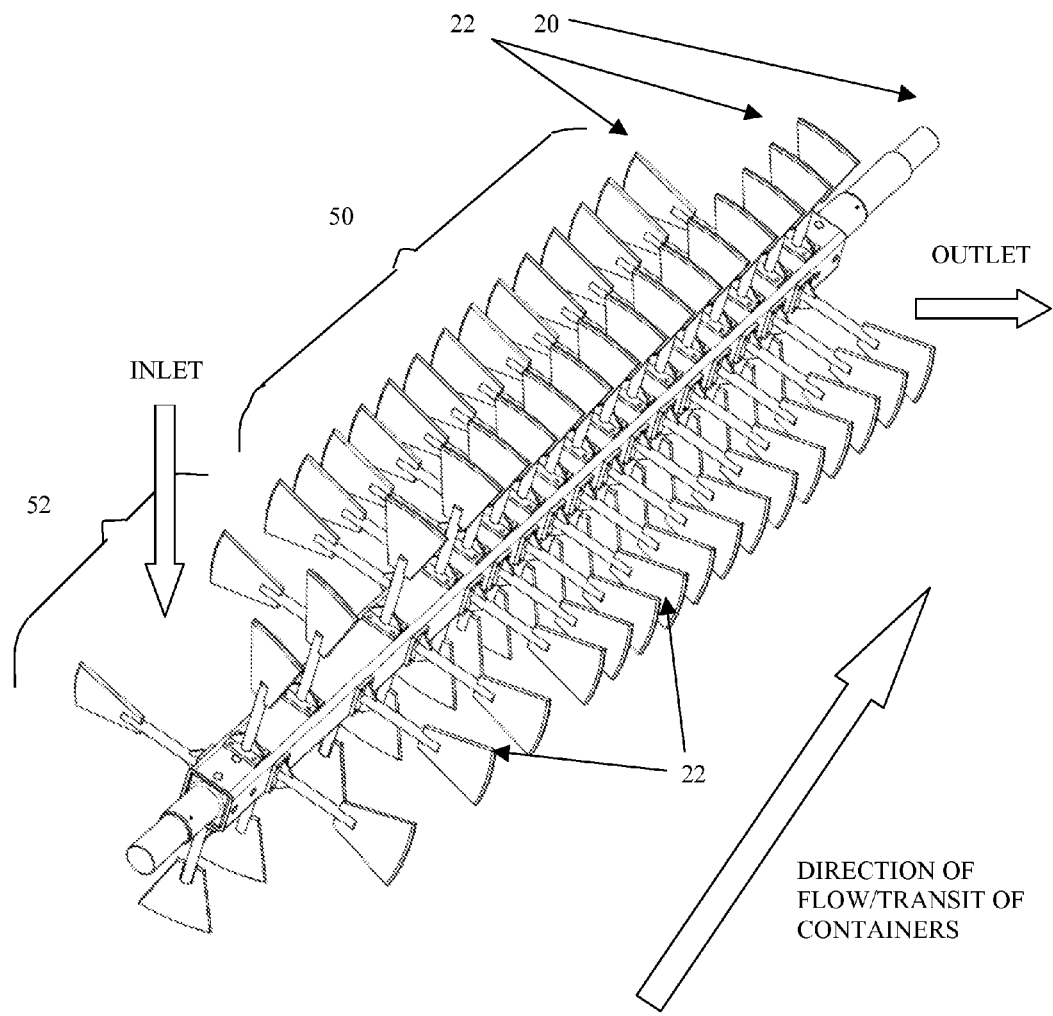
FIG. 4 is an isometric view of the rotor for use in the washing machine of FIGS. 1-3 with two sets of blades in which one set has a wider separation distance between the blades than the other.

Turning to FIG. 4, it can be seen that along the length of the shaft of the agitator 20, there are a trailing set 50 of blades 22 and a leading set 52 of blades 22. The leading set 52 is upstream of the trailing set 50 in the sense that the plastic containers flow or transit from the inlet to the outlet of the machine. The blades 22 of the leading set 52 (those placed below the hopper 16 and the inlet 12 in FIG. 1) are spaced further apart with respect to each other than are the blades 22 of the trailing set 50 with respect to each other. In other words, the distribution of the blades 22 of the leading set 52 are spread apart more from each other than the blades 22 of the trailing set 24. Thus, the leading blade separation distance between successive leading blades of the leading set 52 along the length of the shaft of the agitator 20 (upstream) is greater than the trailing blade separation distance between successive blades of the trailing set 50 along the length of the agitator 20 (downstream).

The distribution of the blades 22 of the leading set 52 (that are spread apart more than the blades 22 of the trailing set 50 and thus define a greater blade separation distance) creates a benefit in avoiding problems that would arise otherwise. The problems that are avoided (thanks to such a distribution) include those from an excessive thrust on the containers entering the washing chamber 10 and from the introduction of small groups of bottles into the washing chamber 10 all at about the same time.

The distribution of the blades 22 of the trailing set 50 (that are closer to each other than the blades 22 of the leading set 52) provide for a more efficient action in treating the containers than would otherwise be the case if the blades were spread apart more. Preferably, the blades 22 of the leading set 52 are oriented so as to provide a greater inclination (e.g. approximately of 15° with respect to a plane perpendicular to axis of the agitator shaft 10) than the inclination (approximately 5°) of the blades 22 of the trailing set 50. Inclination ranges can be, however, from 10° to 30° for the blades of the leading set 52 and from 3° to 8° for the blades of the trailing set 50.

To guarantee the material a constant stay time in the washing chamber 10 during the treatment phase, and therefore optimal filling of containers into the chamber, the extraction auger 30 is equipped with a control unit 36. The control unit 36 drives the motor 35 to automatically vary the extraction speed of the containers according to the current absorption measured on the motor 24 of the agitator 20. Due to this device it is possible to maintain the stay time of the containers substantially constant in the turbulent phase, so as to guarantee a constant washing result independently of the container flow rate at the machine inlet.

In other words, a certain value of the current absorbed by the motor 24 of the agitator 20 corresponds to a certain filling level of containers inside the washing chamber 10. Therefore, according to the settings of the control unit 36, the extraction auger 30 modulates its speed to maintain constant the effort required by the agitator 20. The result is that, while working continuously, it is possible to maintain constant the required filling level of containers inside the washing chamber 10, which determines the duration of the stay time of the containers inside the washing chamber 10 so that the stay time remains constant for carrying out treatment in the washing chamber 10 effectively.

The renewal of at least part of the washing fluid necessary to maintain the level of contamination in the washing chamber 10 constant can also be performed by means of a shower 32 provided with nozzles directed onto the containers extracted by the auger 30. In this case the fluid comes from the stages downstream, in which the level of contamination of the recovered fluid is lower than that of the washing fluid in the chamber 10.

The containers extracted by means of the auger 30 pass through the outlet 38 of the same and are directed to subsequent treatment steps, for example to a further step of separation between the contaminants, including any remaining labels, and the containers performed by means of at least one ballistic screen 50.

The auger 30 can also be provided with high pressure nozzles 3, supplied at pressures above 80 bars (for example 100 bars). Also in this case, the high pressure nozzles 3 are arranged in a favorable position to exert a vigorous hydraulic action for removal of the contaminants and labels, i.e. in a position in which the containers have limited freedom of movement.

Both the nozzles 2 arranged on the chamber 10 and the nozzles 3 arranged on the auger 30 can be supplied with fresh fluid able to restore at least partly the overall fluid content constantly present in the chamber 10, leaving the nozzles 15, and also 32 if necessary, the job of restoring the fraction of filtered and purified fluid coming, for example, from the tank 19.

The extraction auger 30 has a housing that is hydraulically connected to the washing chamber at the outlet 14 and therefore, the washing fluid introduced into the auger housing by the nozzles 3 flow inevitably into the washing chamber 10.

Various modifications can be made to the embodiments represented here without departing from the scope of the present invention. For example, the tearing means can have a different shape from the sharpened or pointed elements 41 of the screws 43, and systems can be provided to simultaneously adjust the protrusion of all the sharpened or pointed elements in one single operation, both on the walls of the chamber 10 and on the blades 22. In the same way, the control units 26 and 36, even if shown for the sake of clarity as separate units, can be integrated in one single main control unit, which controls other functions of the machine or plant in which it is installed.

What is claimed is:

1. A machine that continuously washes plastic containers and removes contaminants and labels from surfaces of the plastic containers, comprising:
    at least one fixed washing chamber having at least one inlet and one outlet for said containers;
    agitation means for facilitating transit of the plastic containers into the washing chamber from the at least one inlet to the at least one outlet and for developing friction action between the plastic containers from rotation of the plastic containers and from rubbing of the plastic containers against one another and against the at least one washing chamber, said agitation means including at least one agitator that has a plurality of agitation blades inside said washing chamber that are positioned to develop the friction action between the plastic containers from rotation of the plastic containers and from rubbing of the plastic containers against one another and against the at least one washing chamber, means for rotating the at least one agitator and the agitation blades to effect the rotation of the plastic containers in a manner that causes the rubbing of the plastic containers against one another and against the at least one washing chamber;
    means for supplying a washing fluid inside said washing chamber;
    means for maintaining constant a filling level of containers inside said chamber and for maintaining constant a staying time of the plastic containers inside said washing chamber;
    tearing means for acting upon the contaminants and labels adhering to the surfaces of said plastic containers during their transit inside said at least one washing chamber, said tearing means including a plurality of sharpened elements protruding towards an inside of the washing chamber that are configured and arranged to detach the contaminants and labels from the surfaces of said plastic containers during transit of the plastic containers inside said at least one washing chamber; and
    means for expelling said washing fluid together with the detached contaminants and the detached labels.

2. The machine as claimed in claim 1, wherein said plurality of sharpened elements are in one or more portions of the walls of said chamber and are pointed.

3. The machine as claimed in claim 1, wherein said plurality of sharpened elements protrude from one or more blades of said agitator and are pointed.

4. The machine as claimed in claim 2, further comprising means for adjusting an extent to which the sharpened elements protrude.

5. The machine as claimed in claim 1, wherein said means for expelling said washing fluid together with the detached contaminants and detached labels is configured and arranged to carry out the expelling in a continuous manner and includes means for filtering through at least one perforated portion of the walls of said washing chamber.

6. The machine as claimed in claim 1, wherein said means for supplying a washing fluid inside said chamber include a plurality of nozzles distributed along the walls of said chamber.

7. The machine as claimed in claim 1, wherein an electric motor is provided to drive said agitator, and wherein control means are provided to rotate said agitator at a speed that attains a tangential velocity, measured at the end of said blades, greater than 2.5 m/s.

8. The machine as claimed in claim 1, wherein an extraction auger is provided in correspondence of the outlet for said containers, said auger having a distribution of a plurality of nozzles.

9. The machine as claimed in claim 8, wherein an electric motor is provided to drive said extraction auger, and wherein control means are provided to regulate an extraction speed of said containers from said washing chamber.

10. The machine as claimed in claim 8, wherein at least one of said nozzles is positioned on said extraction auger and supplied with fluid at a pressure greater than 80 bars.

11. The machine as claimed in claim 1, wherein said at least one agitator is elongated to define a length, said plurality of agitation blades including a leading set of agitation blades and a trailing set of agitation blades, the agitation blades of the leading set being spaced apart from each other along the length of the at least one agitator to define a leading blade separation distance between successive ones of the agitation blades of the leading set and the agitation blades of the trailing set being spaced apart from each other to define a trailing blade separation distance between successive ones of the agitation blades of the trailing set, the leading blade separation distance being greater than the trailing blade separation distance, the leading set being upstream of the trailing set with respect to the transit of the containers from the at least one inlet to the at least one outlet.

12. A method that continuously washes plastic containers and removes contaminants and labels from surfaces of the plastic containers with a machine, comprising:
    providing at least one fixed washing chamber having at least one inlet and one outlet for said containers;
    facilitating with agitation means a transit of the plastic containers into the washing chamber from the at least one inlet to the at least one outlet and for developing friction action between the plastic containers from rotation of the plastic containers and from rubbing of the plastic containers against one another and against the at least one washing chamber, the agitation means including at least one agitator that has a plurality of agitation blades inside said washing chamber that are positioned to develop the friction action between the plastic containers from rotation of the plastic containers and from rubbing of the plastic containers against one another and against the at least one washing chamber, the facilitating including rotating the at least one agitator and the agitation blades to effect the rotation of the plastic containers in a manner that causes the rubbing of the plastic containers against one another and against the at least one washing chamber;

supplying with a supplying means a washing fluid inside said chamber;

acting with a plurality of sharpened elements of a tearing means upon the contaminants and labels adhering to the surfaces of said plastic containers during their transit inside said at least one washing chamber to detach the contaminants and labels from the surfaces of said plastic containers during their transit inside said at least one washing chamber; and expelling with an expelling means said washing fluid together with the detached contaminants and the detached labels.

13. The method as claimed in claim 12, wherein the plurality of sharpened elements are distributed in one or more portions of the walls of said chamber and are pointed.

14. The method as claimed in claim 12, wherein the plurality of sharpened elements protrude from one or more blades of said agitator and are pointed.

15. The method as claimed in claim 12, further comprising adjusting an extent that the plurality of sharpened elements protrude.

16. The method as claimed in claim 12, wherein said expelling of the washing fluid together with the detached contaminants and the detached labels is performed in a continuous manner via a perforated portion of the walls of said washing chamber.

17. The method as claimed in claim 12, wherein said supplying of the washing fluid into said chamber is via a plurality of nozzles distributed along the walls of said chamber.

18. The method as claimed in claim 12, wherein said washing fluid consists of an aqueous solution that includes chemical detergent products and is kept at a temperature below 45° C.

19. The method as claimed in claim 12, further comprising driving said at least one agitator by an electric motor to effect the rotating of said at least one agitator, and wherein said rotating of said at least one agitator is at a speed that attains a tangential velocity, measured at the end of said blades, greater than 2.5 m/s.

20. The method as claimed in claim 12, further comprising extracting said containers from the washing chamber by means of an extraction auger positioned in correspondence of said outlet, said extraction auger having a distribution of a plurality of nozzles, the extracting including exerting a hydraulic action to detach the contaminants and the labels via fluid discharge from the distribution of the plurality of nozzles.

21. The method as claimed in claim 20, further comprising driving said extraction auger by an electric motor to effect the extracting, and regulating an extraction speed of said containers from said washing chamber by suitable control means.

22. The method as claimed in claim 20, further comprising exerting the hydraulic action to detach the contaminants and labels via the fluid discharge from at least one of the nozzles positioned on said extraction auger with the fluid discharge at a pressure greater than 80 bars.

23. The method as claimed in claim 12, wherein the expelling of said washing fluid together with the detached contaminants and detached labels is done in a continuous manner and includes filtering through at least one perforated portion of the walls of said washing chamber to separate the detached contaminants and the detached labels.

24. The method as claimed in claim 12, wherein said at least one agitator is elongated to define a length, said plurality of agitation blades including a leading set of agitation blades and a trailing set of agitation blades; further comprising spacing apart the agitation blades of the leading set from each other along the length of the at least one agitator to define a leading blade separation distance between successive ones of the agitation blades of the leading set, spacing apart the agitation blades of the trailing set from each other to define a trailing blade separation distance between successive ones of the agitation blades of the trailing set, the leading blade separation distance being greater than the trailing blade separation distance, the leading set being upstream of the trailing set with respect to the transit of the containers from the at least one inlet to the at least one outlet.

* * * * *